United States Patent [19] [11] 3,786,834
Garland [45] Jan. 22, 1974

[54] MULTIPLE WAVE FORM SPRING VALVE ASSEMBLY
[75] Inventor: Milton W. Garland, Waynesboro, Pa.
[73] Assignee: Frick Company, Waynesboro, Pa.
[22] Filed: June 21, 1972
[21] Appl. No.: 265,043

[52] U.S. Cl.............. 137/540, 137/512.1, 417/564, 137/516.15
[51] Int. Cl....................... F16k 15/08, F16K 15/12
[58] Field of Search . 137/512, 512.15, 514, 516.17, 137/516.19, 516.21, 516.23, 540, 516.15; 251/337; 267/47, 61, 3, 134, 135, 161; 417/559, 563, 564

[56] References Cited
UNITED STATES PATENTS
1,489,912 4/1924 Winkler............................... 137/512
1,553,323 9/1925 Parks............................. 137/512.15
1,792,343 2/1931 Wikander.............................. 267/47
2,935,248 5/1960 Gerteis........................... 137/512.15
2,957,620 10/1960 Turnwald........................... 417/564
3,114,388 12/1963 Hoen................................. 137/512

FOREIGN PATENTS OR APPLICATIONS
263,023 12/1926 Great Britain........................ 267/47
1,806,274 5/1970 Germany........................... 267/161

Primary Examiner—William R. Cline
Assistant Examiner—George L. Walton
Attorney, Agent, or Firm—A. Yates Dowell, Jr.

[57] ABSTRACT

Apparatus for modulating the rate of opening of the valve member in a valve assembly which includes a plurality of wave form springs for each valve member and a flat rigid spacer between each pair of wave form springs.

1 Claim, 9 Drawing Figures

MULTIPLE WAVE FORM SPRING VALVE ASSEMBLY

BACKGROUND OF THE INVENTION

1. Field of the Invention

This invention relates generally to valves of various kinds for permitting or interrupting fluid flow, and relates particularly to valve structures which are operated automatically due to differentials in pressures on opposite sides thereof.

2. Description of the Prior Art

Heretofore valve members which have been open or closed by differential pressures have found wide acceptance in the art. However, most of these devices have been controlled by coil springs of either the compression or tension type. Some pressure operated valve structures have included one or more leaf springs for controlling the opening of the valve when the pressure differential reached the point where the pressure on one side of the valve was great enough to overcome the energy stored in the springs.

Some efforts have been made to utilize undular or wave form springs since the differential in pressure can be more closely controlled than with coil or leaf springs. Examples of the wave form springs are shown in U.S. Pat. No. 3,114,388 to Hoen and U.S. Pat. Nos. 1,792,343 and 1,832,439 to Wikander. Wave form springs have not been entirely satisfactory, particularly for high speed, high volume, and high compression apparatus, since the depth of the waves or undulations was such as to permit a stress whch exceeded the elastic limits of the material, particularly when subjected to impact forces which occur at high operating speeds.

SUMMARY OF THE INVENTION

The present invention is a multiple wave form spring assembly including a plurality of undular or wave form springs in stacked relationship to each other having a substantially flat spacer ring disposed between each pair of springs. The spring assembly applies a predetermined force against a valve member to force the valve member against a valve seat located adjacent to an opening until a pressure differential on the opposite side of the valve member moves such member away from the seat to discharge fluid under pressure through the opening. Movement of the valve member away from the valve seat sequentially operates the valve form springs of the assembly, while movement of the valve member toward the valve seat is caused by all of the springs simultaneously.

It is an object of the invention to provide a multiple wave form spring assembly which modulates the rate of opening of a valve member to reduce high impact loading thereon.

DESCRIPTION OF THE PREFERRED EMBODIMENTS

Figure 1:
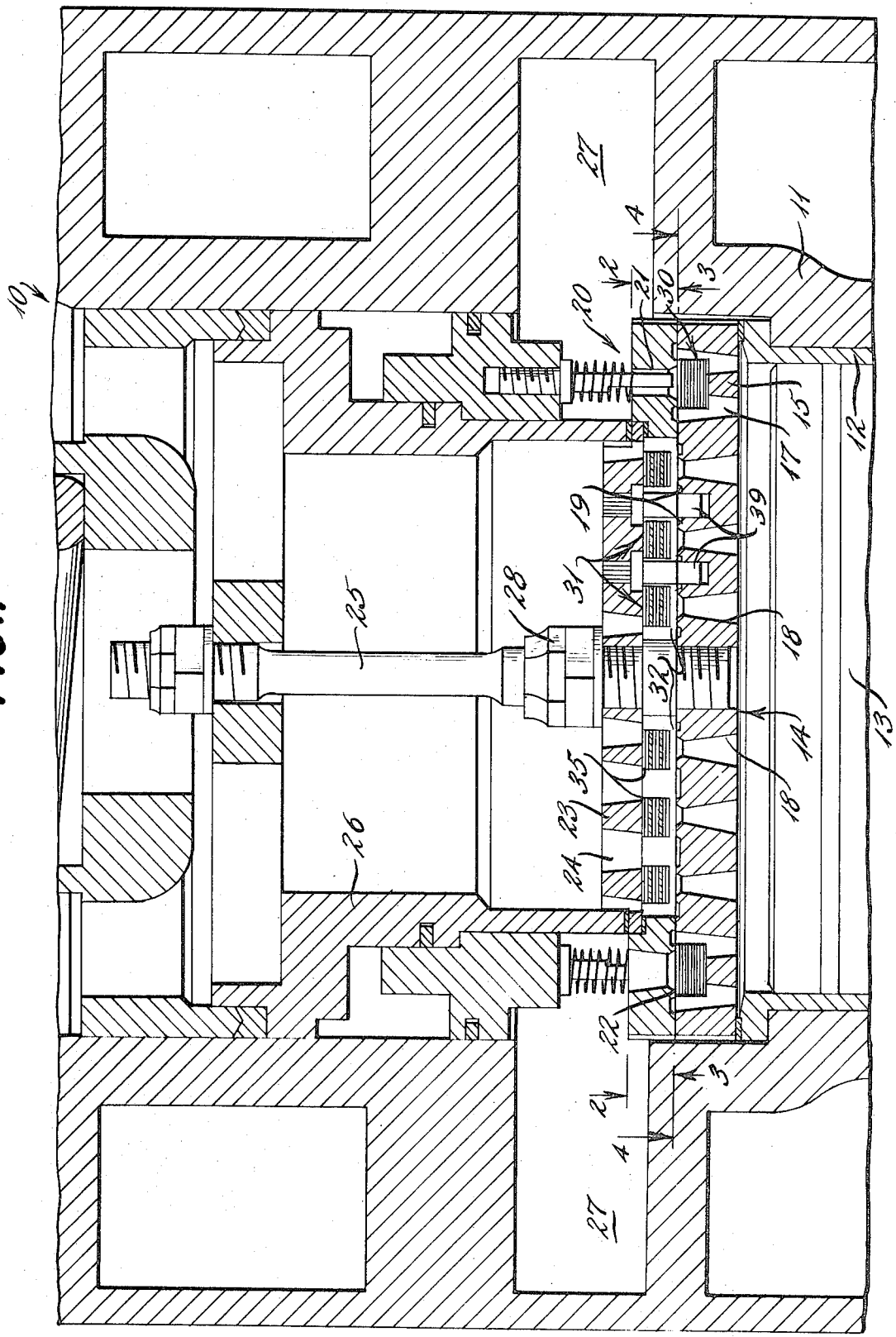
FIG. 1 is a fragmentary sectional view of a high performance compressor illustrating one application of the invention.
Figure 2:
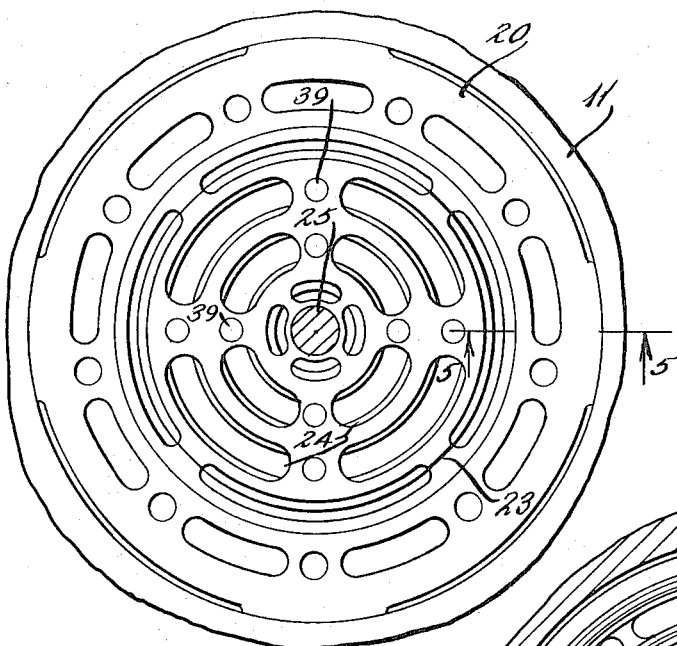
FIG. 2 is a section at a reduced scale on the line 2—2 of FIG. 1.
Figure 3:
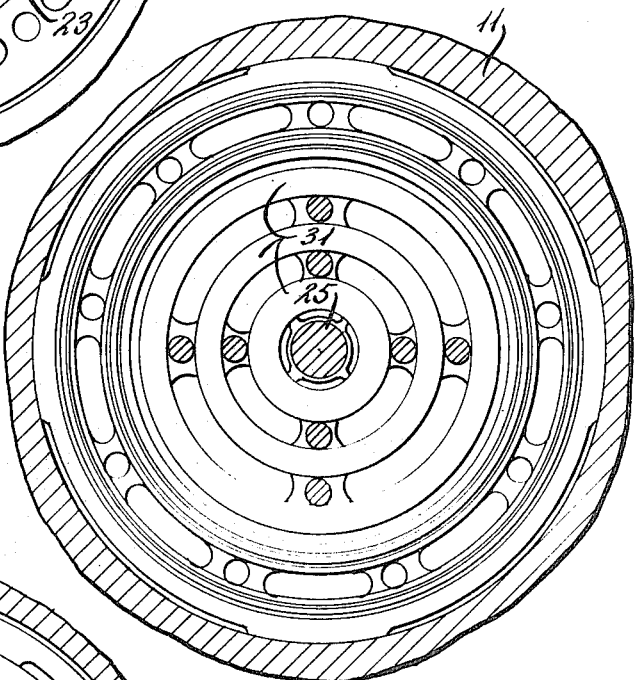
FIG. 3 is a section at a reduced scale on the line 3—3 of FIG. 1.
Figure 4:
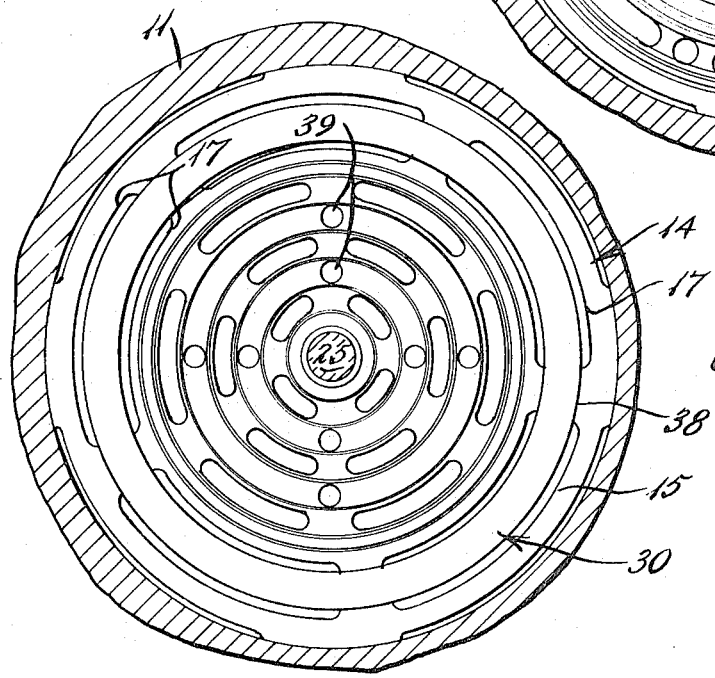
FIG. 4 is a section at a reduced scale on the line 4—4 of FIG. 1.

With continued reference to the drawings, a high performance compressor 10 includes a housing 11 having a sleeve or liner 12 mounted therein which defines a cylinder. A piston 13 is slidably mounted within the cylinder and such piston is operated in any desired manner, such as a crankshaft (not shown) to cause the piston 13 to be raised and lowered alternately. A valve plate 14 is located at one end of the sleeve 12 and such valve plate includes a plurality of inlet openings 17 arranged in a circle and spaced inwardly from the periphery of the plate. Such openings extend entirely through the plate and permit gaseous fluid to be drawn through the valve plate 14 during the suction stroke of the piston 13. A plurality of discharge openings 18 extend through the plate 14 and such openings are arranged in circles generally concentric with the openings 17. The openings 18 have raised valve seats 19 on the surface of the valve plate 14 remote from the piston.

An inlet valve seat ring 20 is provided having a surface in sealing engagement with the valve plate 14 and overlying the openings 17. The seat ring has a plurality of openings 21 which extend through raised valve seats 22 located on the surface adjacent to the valve plate 14. Such inlet valve seat ring 20 is retained in place by a discharge valve support and guide plate 23 (FIG. 1) having a plurality of discharge gas passageways 24 extending therethrough. A bolt 25 carried by a retainer ring 26 extends through a central opening in the plate 23 and threadably engages the valve plate 14. A lock nut 28 carried by the bolt 25 locks the valve plate 14, the inlet valve seat ring 20, and the valve support and guide plate 23 in fixed relationship with each other.

Gaseous fluid to be compressed is introduced into a supply chamber 27 in the housing 11 and when the piston 13 is retracted during the suction stroke, the discharge openings 18 are closed and the inlet openings 17 are opened so that gaseous fluid flows from the chamber 27 through the openings 21 and 17 into the cylinder 12. During this compression stroke of the piston, the inlet openings 17 are closed and after a predetermined pressure has been attained within the cylinder, gaseous fluid under pressure is discharged through the valve plate openings 18, support and guide plate openings 24, and retainer ring 27 into a pressure dome (not shown).

In order to normally close the inlet openings 21 in the inlet valve seat ring 20, as well as the discharge openings 18 in the valve plate 14, a series of multiple wave form spring valve assemblies are provided. A suction assembly 30 is used to close the inlet openings 21, and one or more pressure assemblies 31 are used to close the openings 18 in the valve plate. Each of the assemblies 30 and 31 includes a valve member 32 located adjacent to an associated valve seat and a plurality of alternating wave form springs 33 and spacers 34. If desired, a back retainer 35 can be located remote from the openings to complete the assembly.

Figure 5:
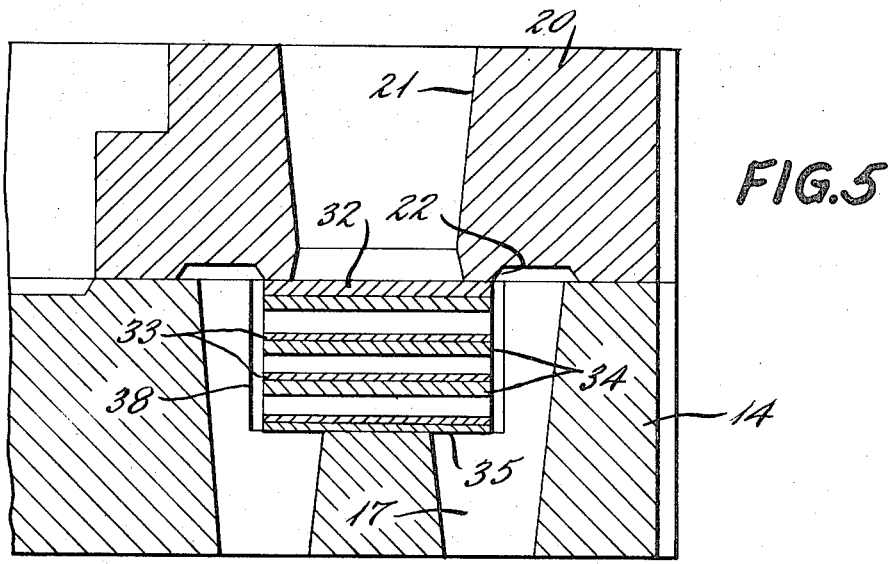
FIG. 5 is an enlarged section on the line 5—5 of FIG. 2.
Figure 6:
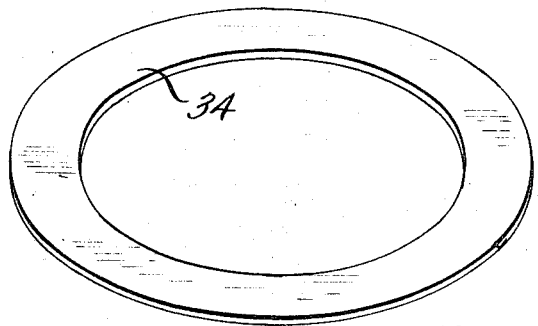
FIG. 6 is a perspective view of one of the spacer rings.
Figure 7:
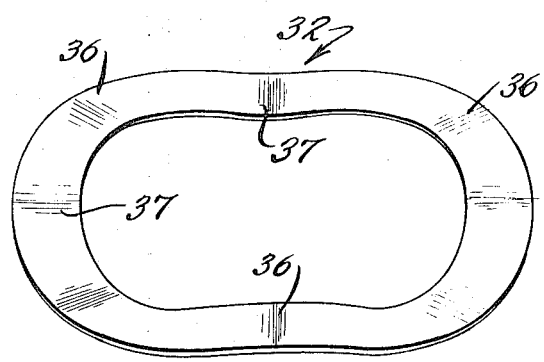
FIG. 7 is a perspective view of one of the wave form springs.

The valve member 32, spacers 34, and back retainer 35 are of a thickness and strength such that they will not materially deflect while supporting the springs 33. It is noted that the valve member 32 usually is substantially thicker than the spacers 34; however, a pair of spacers 34 could be substituted for the valve member 32, as illustrated in FIG. 5. As illustrated in FIG. 7, the wave form springs 33 include a series of undulating hills 36 and valleys 37 arranged so that the crests of the hills frictionally engage one spacer and the bottoms of the valleys frictionally engage another spacer. It is noted that the valleys of one spring engage the valve member 32 and the hills of another spring engage the back retainer 35. The number of hills and valleys of each spring is variable depending upon the circumference or length of the spring and other design factors including the strength and resiliency of the spring material.

Since the inlet valve seat ring 20 engages the valve plate 14, a recessed ring or groove 38 is provided in the valve plate 14 to accommodate the suction assembly 30 and to retain such assembly in position. In order to retain and guide the pressure assemblies 31, while permitting movement in a vertical direction, such pressure assemblies are located between the valve plate 14 and the support and guide plate 23. A plurality of guide posts 39 extend between the plates 14 and 23 and are located adjacent to each of the assemblies 31. The posts 39 are located either inside or outside only of the assemblies 31 so that the springs and spacers of each assembly can vary in width to suit loading requirements by simply using a common inside or outside dimension. As illustrated in FIG. 1, two assemblies could be guided by the same series of posts by locating the outer periphery of the inner assembly adjacent to the posts and locating the inner periphery of the outer assembly adjacent to the same posts.

Since the assembly 30 relies upon the suction created by the piston 13 for its operation, the springs 33 have less strength than the springs of the pressure assemblies 31 which must maintain the valve member 32 closed until a predetermined pressure has been reached. The strength of the springs 33 is substantially the only difference between the suction assembly 30 and the pressure assemblies 31.

Figure 8:
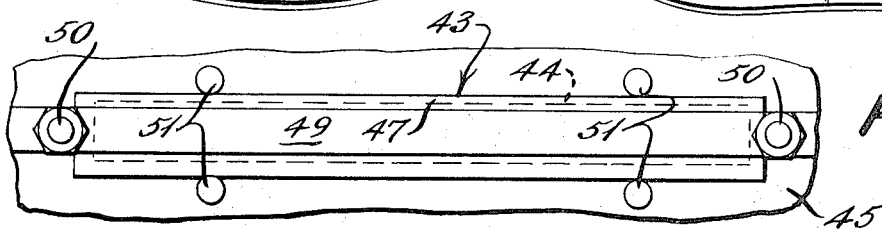
FIG. 8 is a top plan view of a modified form of the invention.
Figure 9:
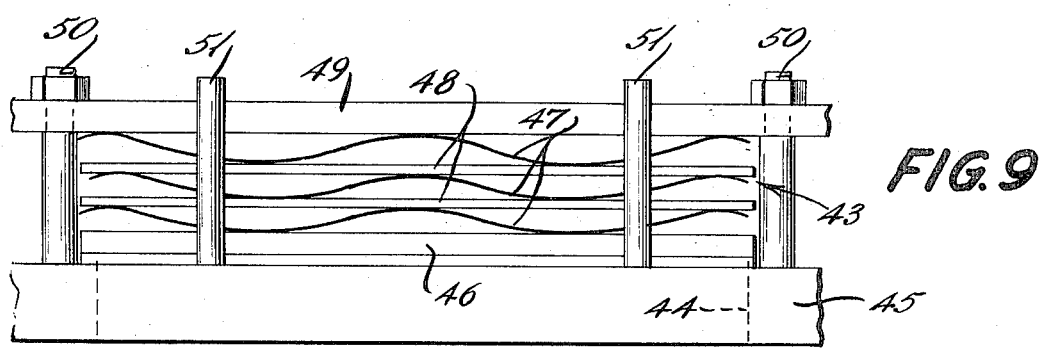
FIG. 9 is a side elevation of the structure of FIG. 8.

With reference to FIGS. 8 and 9, instead of the ring type valve assemblies previously disclosed, a valve assembly 43 is provided for controlling gaseous fluid passing through an elongated opening 44 in a valve plate 45. The valve assembly 43 includes a valve member 46 located adjacent to the opening 44 and a plurality of elongated wave form springs 47 separated by spacers 48. In this modification, a back retainer 49 extends beyond the valve assembly 43 and is mounted on posts 50 fixed to the valve plate 45 at each end of the assembly 43. At least two guide posts 51 are located at each side of the valve assembly 43 to prevent lateral movement of the valve member 46, springs 47, and spacers 48 while permitting vertical movement thereof.

In the operation of the device, during the suction stroke of the piston 13 a negative pressure is created within the cylinder 12 so that gaseous fluid within the chamber 27 unseats the valve member 32 of the suction assembly 30 by forcing such valve member downwardly against the tension of the springs 33. When the valve is open, gaseous fluid flows from the chamber 27 through the openings 21 and 17 into the cylinder to completely fill the cylinder when the piston is fully retracted. At the completion of the suction stroke, the energy within the springs 33 closes the valve member 32 against the valve seat 22 to interrupt any further movement of fluid through such openings.

Movement of the piston 13 on the compression stroke compresses the gaseous fluid within the cylinder until the pressure attains a predetermined value, after which the fluid pressure within the chamber overcomes the tension of the springs 33 of the pressure assemblies 31 and moves the valve member 32 away from the valve seats 19. Movement of the valve member 32 is initially absorbed in the spring 33 adjacent to the valve member and then such movement is transmitted to the first spacer, then the second spring, second spacer and so on. Additional means is added as each spring and spacer is moved, thus reducing the overall impact for a given lift.

Since there is more than one spring in each assembly, each spring has a relatively small deflection, thus increasing the spring's life. The number of springs and spacers may be varied and the strength, width and number of hills and valleys of the springs may be altered to suit specific speed and compression requirements. However, it is contemplated that at least two springs will be provided for each application so that such springs do not approach their elastic limits. The number of spring assemblies is determined by compressor size and the amount of fluid which must be moved through the valve plate in a given period of time.

When the piston 13 reaches the end of the compression stroke, the combined efforts of all of the springs quickly move the valve member 32 to closed position in engagement with the seats 19 of the valve plate.

I claim:

1. In a high performance compressor having a cylinder, a rapidly operating piston reciprocably mounted in said cylinder, and a valve plate at one end of said cylinder having at least one discharge opening with a valve seat, the improvement comprising a substantially non-resilient valve having at least one edge and normally engaging the valve seat of said plate, a first undular wave form spring having shallow hills and valleys with portions of said valleys frictionally engaging said valve, said first spring having at least one edge in alignment with the edge of said valve, a flat substantially non-resilient spacer frictionally engaging portions of the hills of said first spring and having at least one edge in alignment with the edge thereof, a second undular wave form spring having shallow hills and valleys with portions of the valleys frictionally engaging said spacer, said second spring having at least one edge in alignment with the edge of said spacer, a flat substantially non-resilient backing member located in alignment with said second spring and frictionally engaging portions of the hills thereof, means for mounting said backing member in fixed position and in spaced relationship with said valve plate, and guide means disposed along the edges of said valve, springs and spacers for maintaining the same in alignment with each other, whereby movement of said valve away from said valve seat caused by the pressure of fluid within said cylinder sequentially compresses said springs to permit compressed fluid to be discharged through said discharge opening during the compression stroke of said piston and said springs operate simultaneously to close said valve when the compression stroke of said piston is completed.

* * * * *